United States Patent Office 3,463,806
Patented Aug. 26, 1969

3,463,806
PROCESS FOR THE REDUCTIVE DIMERIZATION OF UNSATURATED NITRILES
George de Winter Anderson and Denis Pemberton, Blackley, Manchester, England, assignors to Imperial Chemical Industries Limited, London, England, a corporation of Great Britain
No Drawing. Filed June 18, 1965, Ser. No. 465,148
Claims priority, application Great Britain, July 2, 1964, 27,369/64, Patent 1,069,326
Int. Cl. C07c 121/02, 121/26, 103/02
U.S. Cl. 260—465.8
7 Claims

ABSTRACT OF THE DISCLOSURE

A process for the reductive dimerization of alpha beta olefinically unsaturated nitriles, esters and amides by treating the alpha beta olefinically unsaturated compound with a medium capable of providing reactive hydrogen and an alkali metal or alkaline earth metal amalgam in the presence of a sulphonate. Acrylonitrile is an especially important starting material to make adiponitrile. Preferred sulphonates are aromatic mono-sulphonates and condensates of such sulphonates with an aliphatic aldehyde.

---

This invention relates to the reductive dimerization of $\alpha,\beta$-olefinically unsaturated nitriles, esters and amides and especially to the reductive dimerization of acrylonitrile to produce adiponitrile.

It has been suggested to reductively dimerize acrylonitrile in an aqueous medium with an alkali metal amalgam to produce adiponitrile. We have found that the reductive dimerization may be performed in the presence of certain additives.

Accordingly the present invention provides a process for the reductive dimerization of $\alpha,\beta$-olefinically unsaturated nitriles, esters and amides which comprises treating the $\alpha,\beta$-olefinically unsaturated compound with a medium capable of providing reactive hydrogen and an alkali metal or alkaline earth metal amalgam in the presence of a sulphonate.

By "medium capable of providing reactive hydrogen" we mean a medium (such as water or alcohol) which gives nascent hydrogen or protons with an amalgam.

Preferably the medium capable of providing reactive hydrogen is aqueous.

The process of the present invention is especially applicable to $\alpha,\beta$-olefinically unsaturated nitriles for example acrylonitrile or alkyl substituted acrylonitriles. When acrylonitrile is used adiponitrile is obtained.

Within the term "sulphonate" we wish to include salts and esters of sulphonic acids as well as the free acids. Alkali metal or alkaline earth metal salts are especially suitable.

Preferably the sulphonate is an aromatic mono-sulphonate or a condensate of such a sulphonate with an aliphatic aldehyde such as formaldehyde.

The preferred sulphonate is p-toluene sulphonic acid.

Suitable concentrations of the sulphonate are for example from 0.1% to 50% by weight of sulphonate in the reaction mixture, and preferably from 1% to 15%.

The process may be carried out in a mineral acid medium such as aqueous hydrochloric, sulphuric or phosphoric acid. It is preferred to use aqueous hydrochloric acid. Especially suitable initial concentrations of hydrochloric acid are from 0.1 to 25% weight/volume (calculated in metric units) as anhydrous hydrochloric acid in the aqueous acid.

Examples of the invention will now be described.

EXAMPLE 1

A cylindrical glass reaction vessel 5.6 cm. in diameter and 9.5 cm. deep was closed at its lower end by a glass cloth membrane sealed around the lower periphery of the vessel. The inner surface of the membrane was completely covered by a layer of mercury; the volume of mercury used was 30 ml.

The top of the reaction vessel was provided with a removable cover with an inlet for a platinum wire dipping into the layer of mercury to form a cathode. Within the reaction vessel the platinum wire was sheathed with glass. The reaction vessel was provided with an internal cooling coil and a stirrer was located above the mercury layer.

The reaction vessel was immersed to a depth of about 3 cm. in an aqueous solution of potassium hydroxide (40% by weight) contained in an outer cylindrical glass vessel, the outer vessel being filled to a depth of about 10 cm. with the said potassium hydroxide solution.

A cylindrical anode, 14 cm. in diameter, made from a strip of nickel 4 cm. deep, was inserted in the outer vessel so as to surround the reaction vessel.

A reaction mixture consisting of 21.2 g. of acrylonitrile, 10 g. of p-toluene sulphonic acid and 68 ml. of aqueous hydrochloric acid (containing 18.5 g. hydrochloric acid) was placed in the reaction vessel. Stirring was begun and the temperature of the reaction mixture was maintained at 25° C. to 30° C. while a current of 29 amps was passed between the anode and the cathode.

After the current had been passed for 28 minutes the mixture was removed from the reaction vessel and the vessel was washed out with water. The reaction mixture and washings were combined and steam-distilled. The distillate was saturated with potassium carbonate and the organic layer was separated; the organic layer contained 8.55 g. of acrylonitrile and 2.5 g. of propionitrile.

The aqueous residue from the steam distillation was extracted with chloroform (6 portions, each of 30 ml.). The chloroform extracts were combined, the chloroform was removed by distillation and the residue was distilled to give 7.4 g. of adiponitrile (boiling point 142–143° C./9 mm. Hg).

By way of comparison a reaction was carried out in the same way except that the p-toluene sulphonic acid was omitted from the reaction mixture. The organic layer from the steam distillate contained 8.85 g. of acrylonitrile and 5.0 g. of propionitrile. The yield of adiponitrile was 5.2 g.

EXAMPLE 2

The procedure of Example 1 was repeated except that the p-toluene sulphonic acid was replaced by 5 g. of sodium benzene sulphonate. The yield of adiponitrile was 6.7 g.

EXAMPLE 3

The procedure of Example 1 was repeated except that the p-toluene sulphonic acid was replaced by 10 g. of "sodium Dispersol AS"—the sodium salt of a condensate of naphthalene sulphonic acids with formaldehyde. ("Dispersol" is a tradename).

The yield of adiponitrile was 6.2 g.

What we claim is:
1. In a process for the reductive dimerization of a nitrile selected from the group consisting of acrylonitrile and an alkyl-substituted acrylonitrile to produce adiponitrile or an alkyl-substituted adiponitrile, respectively by contacting said nitrile with a liquid medium capable of providing reactive hydrogen and an amalgam selected from the group consisting of alkali metal amalgam and alkaline earth metal amalgam, the improvement which comprises including a sulphonate in said medium, the sulphonate group being the sole essential substituent of said sulphonate and the latter being otherwise free from substituents which are reactive with said nitrile so as to interfere with the reductive dimerization of said nitrile, said sulphonate being present in the amount of from 0.1% to 50% by weight thereof based on the weight of reaction mixture and being selected from the group consisting of carbocyclic aromatic monosulphonic acids, the corresponding alkali metal and alkaline earth metal salts and condensates thereof with formaldehyde.

2. A process as claimed in claim 1 wherein the sulphonate is an alkali metal carbocyclic aromatic mono-sulphonate.

3. A process as claimed in claim 1 wherein said sulphonate is sodium benzene sulphonate.

4. A process as claimed in claim 1 in which the medium capable of providing reactive hydrogen is an aqueous medium.

5. A process as claimed in claim 1 in which acylonitrile is used with the production of adiponitrile.

6. A process as claimed in claim 1 in which the sulphonate is p-toluene sulphonate.

7. A process as claimed in claim 1 in which the sulphonate is selected from the group consisting of a condensate of a naphthalene mono-acid with formaldehyde and the sodium salt of such a condensate.

References Cited
UNITED STATES PATENTS

| | | | |
|---|---|---|---|
| 3,193,510 | 7/1965 | Baizer | 260—465.8 X |
| 3,267,131 | 8/1966 | Campbell et al. | 260—465.8 |

JOSEPH P. BRUST, Primary Examiner

U.S. Cl. X.R.

260—465.1, 485, 561